ial of slop in distilleries.

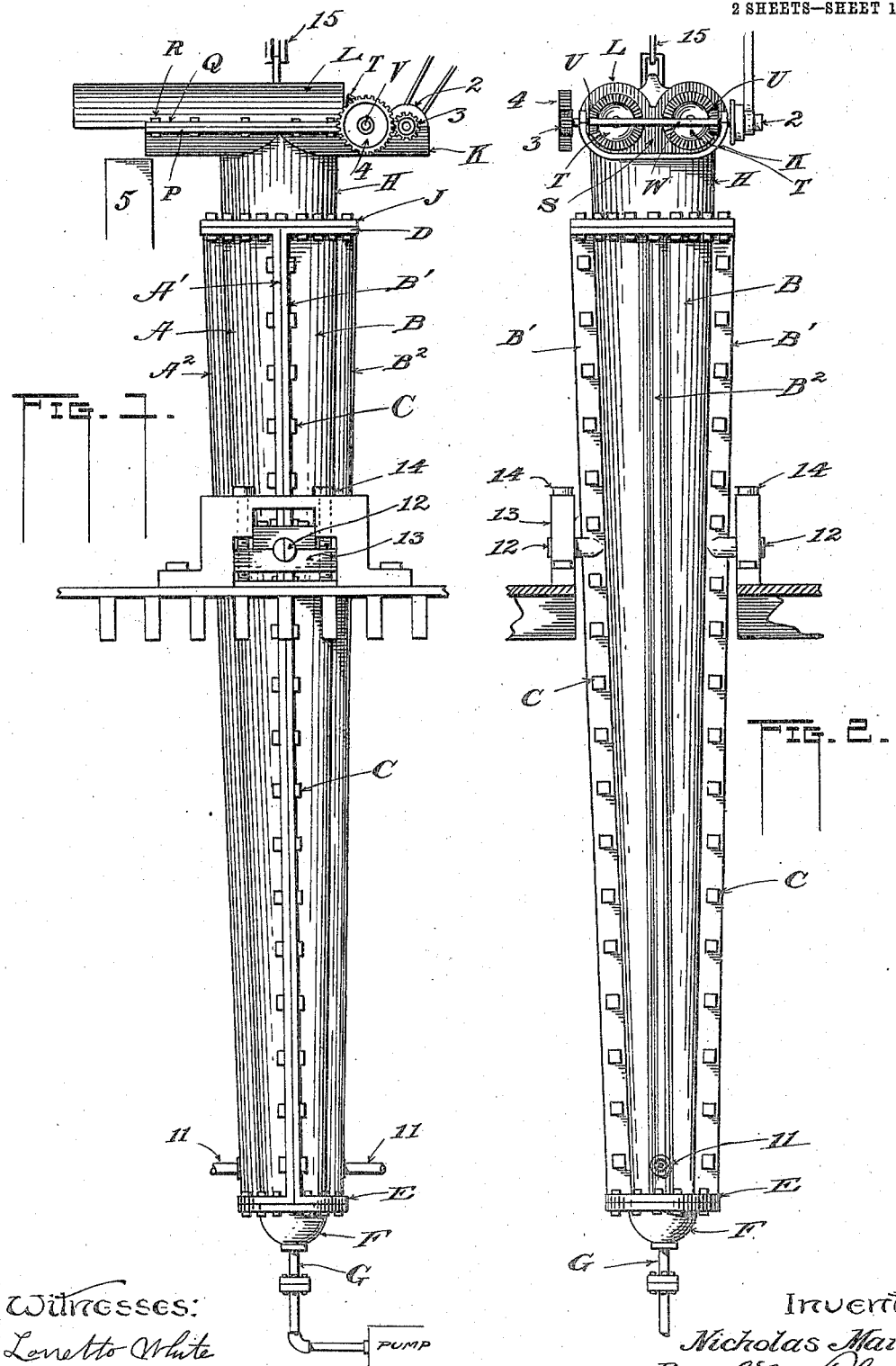

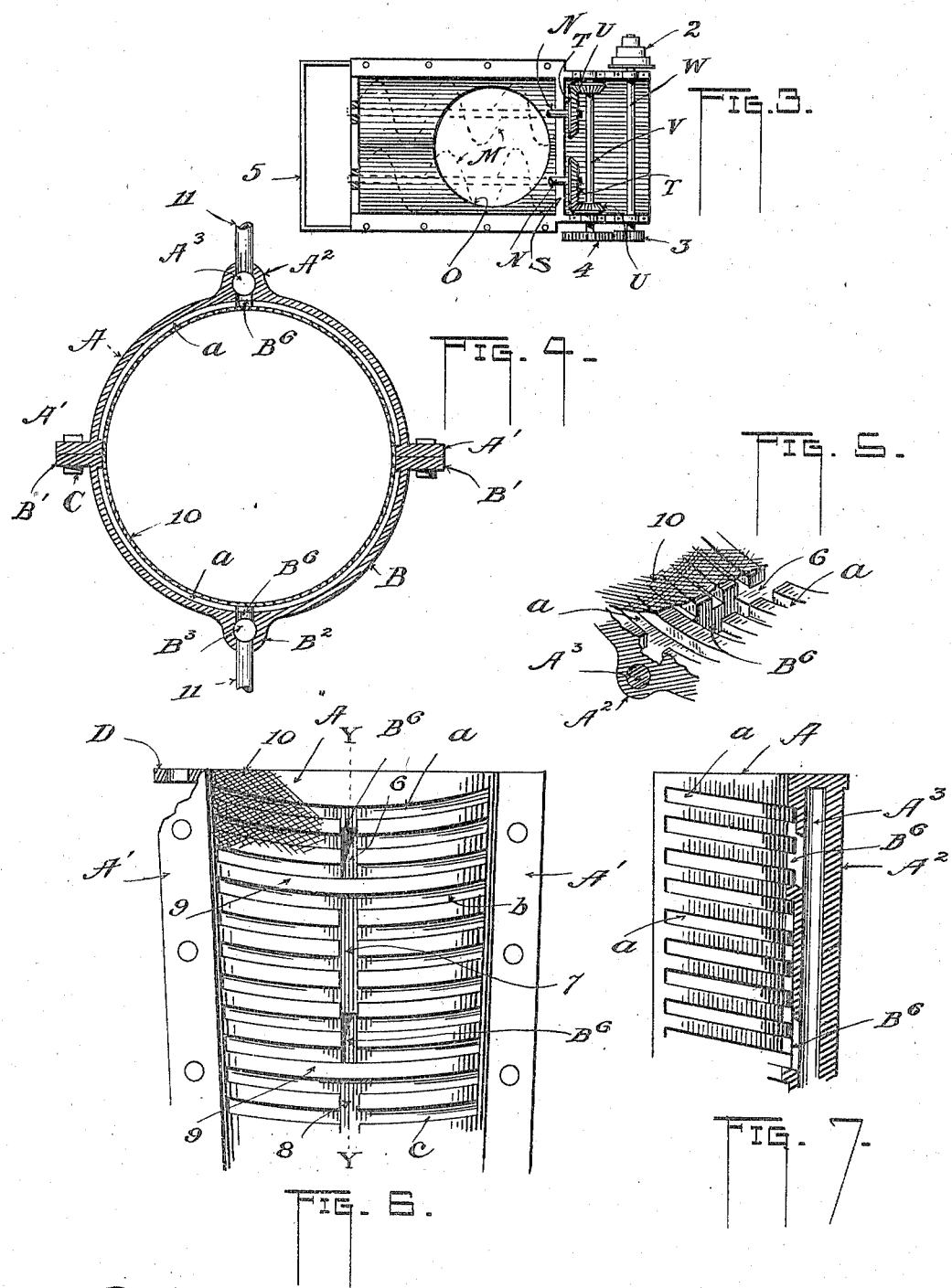

UNITED STATES PATENT OFFICE.

NICHOLAS MARIE, OF PEORIA, ILLINOIS.

FILTERING APPARATUS.

948,180.  Specification of Letters Patent.  Patented Feb. 1, 1910.

Application filed January 6, 1908. Serial No. 409,399.

*To all whom it may concern:*

Be it known that I, NICHOLAS MARIE, citizen of the United States, residing at Peoria, in the county of Peoria and State of Illinois, have invented certain new and useful Improvements in Filtering Apparatus; and I do hereby declare that the following is a full, clear, and exact description of the invention, which will enable others skilled in the art to which it appertains to make and use the same.

This invention relates to an apparatus for separating solid matter from liquids, being adapted for separating slop in distilleries.

The invention has for its main object to erect a filter in which the material to be filtered is entered under pressure at its bottom against the force of gravity whereby said pressure, and gravity, effect the desired separation.

A further object is to provide a vertical type of filter-press of tapered form in which its small end is its bottom into which the material is pumped and forced upward toward the large end; and in which the exit for the solid materials is at the large end.

The invention has certain other objects and relates to certain details of construction as will be pointed out hereinafter.

In the accompanying drawing Figure 1 is a side elevation of my apparatus. Fig. 2 is a front elevation of the same. Fig. 3 is a plan of the head of the apparatus with part thereof removed. Fig. 4 is a horizontal section of the apparatus on a larger scale than that shown in Figs. 1 and 2. Fig. 5 is a detail in perspective of a portion of the interior of one of the sections. Fig. 6 is a plan of the interior surface of one of the sections, and Fig. 7 is a transverse section on the section shown in Fig. 6 on line Y Y.

It is desirable at the present day to filter distiller's and brewer's slops to drive out the water and moisture and save the solid portions for a stock food, and the device about to be described is particularly adapted for this use as well as the filtration of such other materials as can be handled in a filtering apparatus of this class.

In many forms of presses now in use it is often difficult to obtain a steady filtration because the machine becomes choked thus rendering it necessary to take the machine apart to clear it of the packed material before it can be used further. In view of this and other disadvantages well known to the distiller I have devised an apparatus which cannot become packed or choked and I depend upon gravity and the pressure used in entering the slop to the press to properly and completely drive off all the water, while providing for the free exit of the solid pressed material.

In the drawings A and B represent two sections which constitute the body of my apparatus each of which is provided with longitudinal flanges A' and B' respectively for securing the sections together by means of bolts C, there being suitable packing material between the flanges (not shown) by which to constitute perfectly tight joints. As will be seen the body as assembled is conical in form being tapered from its upper end to its lower end and is provided at both its top and bottom with flanges D and E respectively, those at the bottom having bolted thereto a fitting F with which communicates a pipe G through which the slop is pumped into the press to be filtered.

Secured to the top flanges D as by means of bolts D' is a head H having a corresponding flange J said head having cast therewith a horizontal housing K provided with a cap L. This horizontal housing is in the form of two half cylinders placed side by side and cast in one piece within each of which is a conveyer indicated in broken lines at M, in Fig. 3, a portion of each shaft of said conveyers being indicated by the letter N. Both cylinders of said housing as shown by the opening at O, Fig. 3, communicate with the body A B and said housing K and its cap are provided with corresponding flanges P and Q respectively, for securing them together by means of bolts R. The shafts N have their bearings in a front wall S of the housing and their opposite ends have suitable bearing on any convenient part of the machine. Outside the wall S the shafts are provided with beveled gears T with which mesh beveled pinions U on a shaft V lying at right angles to said shafts N and which has its bearings upon a projection of said housing K substantially as shown. Parallel to this shaft V is a shaft W carrying at one end a stepped "pulley or cone" 2 the opposite end of said shaft carrying a pinion 3 which meshes with a gear 4 on one end of the said shaft V. The driving relation between the pinions V and the gears T is such that the conveyers are driven in opposite directions and the rear end of the housing K is open for the discharge of the material from the conveyers.

Beneath the open end of the housing and beneath the discharge ends of the conveyers, is a hopper 5 for receiving and carrying away the material. The inner surfaces of the body A B are provided with grooves $a$ $b$ $c$ as shown in Figs. 4, 5, 6 and 7 which extend around the inner surface of each half or section, their ends terminating a short distance from the juncture of the sections. The grooves are preferably curved downward from their ends as shown in Fig. 6 so that the middle thereof are their lowest points. At these points the grooves which are divided into groups are connected by central vertical grooves indicated by 6, 7 and 8 each series of the grooves being separated from its neighbor by leaving a continuous rib at intervals, as for instance, at 9. Outside of each half of the body and preferably cast therewith is an enlargement $A^2$ and $B^2$ through each of which extends a vertical passage $A^3$ and $B^3$ respectively, with which the vertical grooves 6, 7 and 8 communicate through openings $B^6$, Figs. 4 and 7.

Lying upon and fitting the inner concaved surface of the sections A B is a lining of perforated material 10 constituting a strainer and connected into the bottom of each of the vertical passages $A^3$ and $B^3$ is a pipe 11 for the discharge of water.

The operation is as follows:—The slop is entered through the pipe G, the solid portions gradually fill it, while the water passes through the strainer 10 into the passages 6, 7 and 8 and thence into the vertical passages $A^3$ and $B^3$ through the openings $B^6$ finding its outlet through the pipes 11 to the sewer. The solid portions since they find no outlet are retained and, as just stated, gradually fill the press and when the latter is full the compression due to the continued pump pressure causes the water to be squeezed out. At the top of the press the material, which is in a solid semi-dry state, is forced against the conveyers. By flaring the body from its bottom upward the material can never become packed so as to choke the press but will always clear itself. The flare permits the material to slowly move toward the exit and the conveyers, which serve to hold it back sufficiently for compression purposes, slowly eject it. The bulk of the water will, of course, be immediately discharged by gravity upon entering the press while that held by the solid material will be driven off by the high pressure when the press is full.

In order that I may be enabled to readily reach the interior of the apparatus, which is of considerable length, I preferably support it upon a floor or platform suspending it therefrom on trunnions 12 half of which may be cast with each of the halves A B if desired, or cast entirely with but one of them. These trunnions are preferably mounted in a suitable bearing indicated at 13 which has provision for vertical adjusting through bolts 14. When it is desired to take the machine apart the bolts are removed from the flanges E at the bottom and from the flanges D at the top, and the head H and its housing K is raised free of the press by means, for instance, of a chain 15 or tackle (not shown). This having been done, by turning the bolts 14 the entire press will be raised to clear the fitting F and can then be tilted on its trunnions to a horizontal position level with the floor that supports it, the waste pipes being so arranged as to offer no interference to this movement. Having been placed in this horizontal position the bolts which clamp the flanges A′ and B′ together are removed and the upper half of the cylinder removed. The strainer 10 can then be removed to expose the remaining lower half of the filter. The reverse operation will place the filter in position for performing its work as before.

For cleaning purposes water may be pumped into the device after closing the discharge pipes 11; then by a reversal of the pump connection it may be pumped out bringing with it all solid substances.

Having described my invention, I claim:

1. A filtering apparatus comprising a vertically disposed body having a tapered bore whose small end is lowermost the said body being provided on its inner surface with a series of circumferential grooves, conduits connecting the grooves, a pump connected with the small end of the body to introduce slop thereto, there being an opening communicating with the conduits for the escape of fluid, and an exit at the upper large end of the body through which the solid materials are positively delivered due to pressure from said pump, and power driven means for governing the discharge of the solids therethrough.

2. In a filtering apparatus, a vertically disposed body having a tapered bore whose small end is lowermost, there being a series of circumferential grooves in the inner surface of the body within the bore, vertical conduits connecting the grooves outside the bore, there being escape openings in said conduits, a pump connected into the lower end of the body, there being an escape opening in the upper end of the body communicating with the bore, and means at said opening for governing the rate of discharge of solids therethrough, all being arranged substantially as set forth.

3. A filtering apparatus comprising a vertically disposed body having a conical bore whose small end is lowermost, a closure for said lower end, a pump connected into the lower end of the said body, there being a series of grooves in the inner surface of the body disposed circumferentially, there being a discharge opening communicating with the grooves, said grooves being inclined toward the conduit for the discharge of fluid thereinto, a strainer to overlie the grooves, and means at the large end of the body to govern the rate of discharge of solid material introduced by the pump.

4. A filtering apparatus comprising a vertically disposed body having a conical bore whose small end is lowermost, a closure for said lower end, a pump connected into the lower end of the body, the inner surface of said body being provided with a series of corrugations, a strainer to overlie said corrugations, there being a discharge opening communicating with the corrugations, a closure for the large end of the body, there being an opening in said closure, and means to govern the rate of discharge of solid materials through said opening.

5. A filtering apparatus comprising a vertically disposed body of two separate sections provided with a conical bore whose small end is lowermost, trunnions for said body on which it is tilted, the place of separation of the sections extending through the trunnions, a support to carry the trunnions, the inner surface of the sections being corrugated, there being a discharge opening for the corrugations through the wall of the body, a strainer overlying the corrugations, a closure for the lower end of the body, a pump detachably connected into the lower end of the body, a closure for the large end of the body the same having an opening therein, and means to govern the rate of discharge of solid materials therethrough.

In testimony whereof I affix my signature, in presence of two witnesses.

NICHOLAS MARIE.

Witnesses:
E. J. ABERSOL,
L. M. THURLOW.